United States Patent [19]

Izumi et al.

[11] Patent Number: 4,691,284

[45] Date of Patent: Sep. 1, 1987

[54] CONTROL SYSTEM FOR THREE WAY VARIABLE SHOCK ABSORBER DEVICE FOR SUSPENSION WITH HIGHEST SHOCK ABSORBER EFFECTIVENESS NOT SELECTED IN MANUAL MODE

[75] Inventors: Toshio Izumi; Ryozo Saito; Yoichi Kato; Hiroshi Miyata, all of Toyota, Japan

[73] Assignee: Toyota Jidosha Kabushiki Kaisha, Aichi, Japan

[21] Appl. No.: 681,586

[22] Filed: Dec. 14, 1984

[30] Foreign Application Priority Data

Aug. 18, 1984 [JP] Japan .................................. 59-172146

[51] Int. Cl.⁴ .............................................. B60G 17/00
[52] U.S. Cl. ..................................... 364/424; 188/299; 280/703; 280/707
[58] Field of Search ........................ 364/424, 426, 425; 188/266, 278–280, 283, 285, 297, 299, 310; 280/703, 707

[56] References Cited

U.S. PATENT DOCUMENTS

| | | | |
|---|---|---|---|
| 4,333,668 | 6/1982 | Hendrickson et al. | 280/703 |
| 4,527,676 | 7/1985 | Emura et al. | 188/299 |
| 4,555,126 | 11/1985 | Ishimitsu et al. | 280/707 |
| 4,564,215 | 1/1986 | Kumagai et al. | 280/707 |
| 4,575,116 | 2/1986 | Miyata | 280/707 |
| 4,586,728 | 5/1986 | Tokunaga et al. | 280/707 |

*Primary Examiner*—Parshotam S. Lall
*Assistant Examiner*—Thomas G. Black

*Attorney, Agent, or Firm*—Parkhurst & Oliff

[57] ABSTRACT

A vehicle suspension includes a variable damping effectiveness type shock absorber, which has an actuator and according to selective actuation thereof can be set to first, second, or third conditions which respectively cause the shock absorber to provide minimum, medium, or maximum damping effect. A control system for this suspension includes: a means for detecting one or more parameters relating to the operational condition of the vehicle and for outputting information signals representative thereof; a means for being manually controlled by an operator and for selecting between first manual, second manual, and auto operational modes; and a control means for: when the manual selecting means is selecting the first manual mode, actuating the actuator to its first condition; when the manual selecting means is selecting the second manual mode, actuating the actuator to its second condition; and, when the manual selecting means is selecting the auto operational mode, actuating the actuator to one of a set of its conditions including its first condition and its third condition according to the information signals outputted by the detecting means. The vehicle operational parameters may include steering angle and vehicle speed which can cause body roll, jerk and sharp acceleration which can cause vehicle squat, braking which can cause vehicle nose diving, and vehicle shift-offable state which can cause starting squat and tail lift; and this selective increase of shock absorber damping effect when these parameters take on troublesome values prevents these problems.

10 Claims, 6 Drawing Figures

CONTROL SYSTEM FOR THREE WAY VARIABLE SHOCK ABSORBER DEVICE FOR SUSPENSION WITH HIGHEST SHOCK ABSORBER EFFECTIVENESS NOT SELECTED IN MANUAL MODE

BACKGROUND OF THE INVENTION

The present invention relates to a control system for a shock absorber device used in a suspension of an automobile, and more particularly relates to such a control system which controls a shock absorber which can be set to three different levels of damping effectiveness.

The present patent application has been at least partially prepared from material which has been included in Japanese Patent Application No.Showa 59-172146 (1984), which was invented by the same inventors as the present patent application, and the present patent application hereby incorporates the test of that Japanese Patent Application and the claim or claims and the drawings thereof into this specification by reference; a copy is appended to this specification.

The suspension of a vehicle such as an automobile typically incorporates at least one, and usually a plurality, of shock absorber devices, in order to provide damping action for the movement of the vehicle body with respect to the wheels thereof. Now, the amount of damping effect of such a shock absorber is preferred to be relatively low in order to provide good and comfortable vehicle ridability, but paradoxically is preferred to be relatively high in order to provide good and stable vehicle steering characteristics and turning characteristics such as anti roll, as well as good acceleration and braking characteristics such as anti squat and anti dive and anti starting squat and anti starting tail lift.

For this reason, there have been developed various types of shock absorber devices which have variable damping effectiveness. In the utilization of such a shock absorber for the suspension system of an automobile a control system therefor is provided which controls the damping effectiveness of the shock absorber, and varies it in accordance with various parameters of the vehicle relating to its operational conditions. Such systems are disclosed in Japanese Utility Model Laying Open Publication No.Showa 56-147107 (1981), Japanese Patent Laying Open Publication Ser. No.Showa 58-25708 (1983) relating to an application by an applicant the same as the applicant of the Japanese Patent Application of which priority is being claimed in this present patent application, Japanese Patent Laying Open Publication Ser. No. Showa 58-30541 (1983), Japanese Patent Laying Open Publication Ser. No.Showa 58-30542 (1983), Japanese Patent Laying Open Publication Sho 58-30818 (1983), Japanese Patent Laying Open Publication Ser. No.Showa 58-167210 (1983), and Japanese Patent Application Ser. No.Showa 59-4157 (1984), none of which are intended hereby to be admitted as prior art to the present patent application except to the extent otherwise required by law.

Such a shock absorber device is typically adjustable with regard to its damping effectiveness either to two discrete conditions, a first condition in which it provides a lower value of damping effectiveness and a second condition in which it provides a higher value of damping effectiveness, or to three discrete conditions, a first condition in which it proivdes a minimum value of damping effectiveness, a second condition in which it provides a medium value of damping effectiveness, or a third condition in which it provides a maximum value of damping effectiveness. In a typical control system for such a shock absorber device, the action is typically such that, either manually according to the preference of the vehicle operator or automatically according to the operational conditions of the vehicle, the shock absorber device is switched between its various conditions to provide varying damping effectiveness. For example the shock absorber device control system in the 1983 model Toyota Soarer GT automobile, which is manufactured by the applicant of the Japanese Patent Application of which priority is being claimed in this present patent application, can be manually set by the vehicle operator operating a mode select switch provided within the passenger compartment to any one of a "normal mode", a "sport mode", and an "auto mode". In the "normal mode" the damping effectivenesses of the shock absorber devices of the suspension of the vehicle are set to be constant at a relatively small value; in the "sport mode" said damping effectivenesses of said shock absorber devices are set to be constant at a relatively large value; and in the "auto mode" said damping effectivenesses of said shock absorber devices are switched between said relatively small value and said relatively large value according to signals output from various detecting means such as sensors and switches which detect operational parameters of the vehicle. In this way, it is possible to keep the shock absorbers of the suspension of the vehicle generally operating with sufficiently low damping effectiveness to provide good vehicle ridability, while at the same time when necessary altering the suspension characteristics of the vehicle so as to prevent such undesirable operational problems as vehicle body roll when the vehicle is turning a corner at speed, vehicle squat when the vehicle is being accelerated sharply, vehicle nose dive when the vehicle is being sharply braked, and vehicle starting squat when the vehicle is being accelerated away forward from rest as well as vehicle starting tail lift when the vehicle is being accelerated away backward from rest.

This type of system is effective, but suffers from the problem that in the manual or driver controlled mode the damping effectivenesses of the shock absorber devices can be set to the largest available value, i.e. to the hardest setting. This means that there is a risk that the case may arise wherein, for example due to improper or injudicious actuation of the system by the vehicle driver, the shock absorber devices are set to high damping effectivenesses which are harder than necessary, and the vehicle ridability may thereby be deteriorated. This means that operational comfort may be bad if, for example, the driver erroneously makes an operational mode selection which is inappropriate for the particular vehicle operational circumstances, or the driver is unaccustomed to the operation of the mode select switch and neglects its use, or the driver wrongly operates the mode select switch.

SUMMARY OF THE INVENTION

Accordingly, it is the primary object of the present invention to provide a control system for such an adjustable shock absorber device for a suspension, which prevents the shock absorber device, during manual system operation, being set to its hardest setting in which it provides its greatest value of damping effectiveness.

It is a further object of the present invention to provide such a control system for such an adjustable shock absorber device which allows the shock absorber device, during automatic system operation, to be set to its hardest setting in which it provides its greatest value of damping effectiveness.

It is a further object of the present invention to provide such a control system for such an adjustable shock absorber device which allows the full operational potential of the shock absorber device to be realized during automatic system operation.

It is a further object of the present invention to provide such a control system for such an adjustable shock absorber device which, during automatic system operation, allows the shock absorber device to be set to any one of its settings according to vehicle operational conditions.

It is a further object of the present invention to provide such a control system for such an adjustable shock absorber device which, during automatic system operation, ensures good vehicle ridability.

It is a further object of the present invention to provide such a control system for such an adjustable shock absorber device which, during automatic system operation, ensures good vehicle steering stability.

It is a further object of the present inventon to provide such a control system for such an adjustable shock absorber device which prevents that, due to improper or injudicious manual actuation of the system by the vehicle driver, the shock absorber device should be set to an over high damping effectiveness which is harder than necessary.

It is a yet further object of the present invention to provide such a control system for such an adjustable shock absorber device which prevents that due to improper manual operation by the driver the vehicle ridability should be deteriorated.

It is a yet further object of the present invention to provide such a control system for such an adjustable shock absorber device which prevents deterioration of vehicle operational comfort due to an unskilful vehicle driver erroneously making an operational mode selection which is inappropriate for particular vehicle operational circumstances.

It is a yet further object of the present invention to provide such a control system for such an adjustable shock absorber device which prevents deterioration of vehicle operational comfort due to neglect of operation of said control system by the vehicle driver who may be unaccustomed to the operation of the mode select switch thereof.

It is a yet further object of the present invention to provide such a control system for such an adjustable shock absorber device which prevents poor vehicle ridability due to wrong operation of said mode select switch by said vehicle driver.

It is a yet further object of the present invention to provide such a control system for such an adjustable shock absorber device which is capable in auto mode of recognizing vehicle operational conditions which can lead to vehicle body roll, and is further capable of setting the shock absorber device to high damping effectiveness at this time.

It is a yet further object of the present invention to provide such a control system for such an adjustable shock absorber device which is capable in auto mode of recognizing vehicle operational conditions which can lead to vehicle acceleration squat, and further sets the shock absorber device to high damping effectiveness at this time.

It is a yet further object of the present invention to provide such a control system for such an adjustable shock absorber device which is capable in auto mode of thus recognizing and coping with vehicle operational conditions which can lead to vehicle nose dive.

It is a yet further object of the present invention to provide such a control system for such an adjustable shock absorber device which is capable in auto mode of thus recognizing and coping with vehicle operational conditions which can lead to vehicle starting squat and/or tail lift.

According to the most general aspect of the present invention, these and other objects are accomplished by, for a variable damping effectiveness type shock absorber, comprising an actuator, for a suspension of a vehicle, said shock absorber by selective actuation of said actuator to respectively a first condition, a second condition, and a third condition being selectively settable to any one of a first state in which said shock absorber provides a minimum amount of damping effect, a second state in which said shock absorber provides a medium amount of damping effect, and a third state in which said shock absorber provides a maximum amount of damping effect: a suspension control system, comprising: (a) a means for detecting one or more parameters relating to the operational condition of the vehicle and for outputting information signals representative thereof; (b) a means for by manual control by an operator selecting between a first manual operational mode, a second manual operational mode, and an auto operational mode; and (c) a control means for: when said manually controlled selecting means is selecting said first manual operational mode, actuating said actuator to its said first condition; when said manually controlled selecting means is selecting said second manual operational mode, actuating said actuator to its said second condition; and, when said manually controlled selecting means is selecting said auto operational mode, actuating said actuator to one of a set of its said conditions including its said first condition and its said third condition, according to said information signals representing the operational condition of the vehicle outputted by said detecting means.

According to such a structure, when the manually controlled selecting means is set by the vehicle operator to either of its manual modes, i.e. is selecting said first manual operational mode or said second manual operational mode, then said actuator for said shock absorber device is only set to its said first condition or its said second condition, and is never set to its said third condition; and accordingly the shock absorber device is prevented, during manual system operation, from being set to its hardest setting in which it provides its greatest value of damping effectiveness. Thus, since the hardest setting of said shock absorber device is not available in manual mode, it is prevented that, due to improper or injudicious manual actuation of the system by the vehicle driver, the shock absorber device should be set to an over high damping effectiveness which is harder than necessary, and that due to such improper manual operation by the driver the vehicle ridability should be deteriorated. Thus, deterioration of vehicle operational comfort due to an unskilful vehicle driver erroneously making an operational mode selection which is inappropriate for particular vehicle operational circumstances, or due to neglect of operation of said control system by a vehicle driver who may be unaccustomed to the operation of the mode select switch thereof, is positively prevented. Further, when the manually controlled selecting means is set by the vehicle operator to its automatic mode and is selecting said auto operational mode, then said actuator for said shock absorber device can be set, according to vehicle operational conditions, either to its said first condition, to its said second condition, or to its said third condition; and accordingly the shock absorber device is, during automatic system operation, allowed to be set to its hardest setting in which it provides its greatest value of damping effectiveness, so that the full operational potential of the shock absorber device is allowed to be realized during automatic system operation. Thereby, during automatic shock absorber control operation, satisfactory vehicle ridability and steering stability can be provided.

Further, according to a more particular aspect of the present invention, these and other objects are more particularly and concretely accomplished by a suspension control system as described above, wherein said selecting means, when thus selecting said auto operational mode, is for further selecting according to said manual control by the operator between a first auto operational mode and a second auto operational mode; wherein said control means, when said manually controlled selecting means is thus selecting said first auto operational mode, is for actuating said actuator to either its said first condition or its said third condition according to said information signals representing the operational condition of the vehicle outputted by said detecting means; and wherein further said control means, when said manually controlled selecting means is thus selecting said second auto operational mode, is for actuating said actuator to either its said second condition or its said third condition according to said information signals representing the operational condition of the vehicle outputted by said detecting means.

According to such a structure, the vehicle operator can select at will between an automatic operational mode in which the shock absorber device damping effectiveness is switched between a minimum value and a maximum value, and another automatic operational mode in which the shock absorber device damping effectiveness is switched between a medium value and said maximum value. Thereby the suspension characteristics of the vehicle may be adjusted by the driver, even in the automatic mode, according to his or her particular taste.

Further, according to other particular aspects of the present invention, there may be provided a suspension control system as described above, wherein said detecting means comprises a vehicle speed sensor which outputs a signal representative of vehicle road speed, and wherein said control means is for, when said vehicle speed sensor is outputting to it a signal indicating a vehicle speed of at least a determinate speed value, and said manually controlled selecting means is selecting said auto operational mode, actuating said actuator to one or the other of its said second condition and its said third condition, according to other information signals outputted by said detecting means. In this case it is provided that the vehicle steering stability during high speed operation is improved, while maintaining good vehicle ridability, especially if, as is also preferable, when said vehicle speed sensor is outputting a signal indicating a vehicle speed of below said determinate speed value, and said manually controlled selecting means is selecting said auto operational mode, said actuator is actuated to one or the other of its said first condition and its said third condition. Also, said detecting means may comprise a vehicle speed sensor which outputs a signal representative of vehicle road speed and a vehicle steering angle sensor which outputs a signal representative of turning angle of a steering system of the vehicle, and in this case said control means should be for, when said vehicle speed sensor and said vehicle steering angle sensor are outputting to its signals indicating a combination of vehicle speed and vehicle steering angle which is liable to cause body roll, and said manually controlled selecting means is selecting said auto operational mode, actuating said actuator to its said third condition. This system cam reduce vehicle body roll while cornering. Also, said detecting means may comprise a vehicle throttle sensor which outputs a signal representative of vehicle engine load, and in this case said control means should be for, when said vehicle throttle sensor is outputting to it a signal indicating a vehicle powering condition which is liable to cause vehicle body squat, and said manually controlled selecting means is selecting said auto operational mode, actuating said actuator to its said third condition. This system can reduce vehicle squat while accelerating. Further, said detecting means may comprise a vehicle braking sensor which outputs a signal representative of vehicle braking situation, and in this case said control means should be for, when said vehicle braking sensor is outputting to it a signal indicating a vehicle braking condition which is liable to cause vehicle body nose diving, and said manually controlled selecting means is selecting said auto operational mode, actuating said actuator to its said third condition. This system can reduce vehicle nose dive while braking. Yet further, said detecting means may comprise a vehicle transmission sensor which outputs a signal representative of vehicle transmission driving capability, and in this case said control means should be for, when said vehicle transmission sensor is outputting to it a signal indicating a vehicle transmission driving capability condition which is liable to cause vehicle starting squat or tail lift, and said manually controlled selecting means is selecting said auto operational mode, actuating said actuator to its said third condition. This system can reduce vehicle starting squat and starting tail lift.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENT

Figure 1:
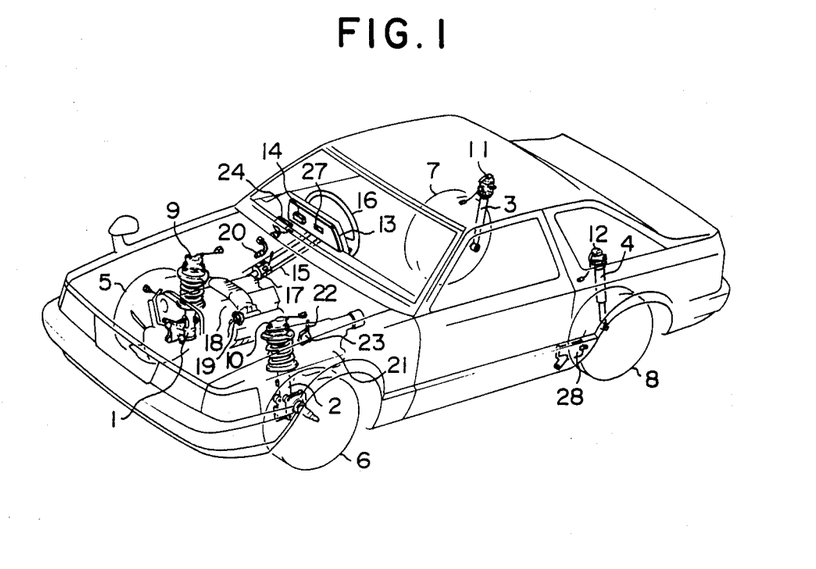
FIG. 1 is a diagrammatical perspective view of an automobile equipped with an automatic transmission and with a suspension control system including four shock absorber devices each of which is controlled with regard to its damping effectiveness by an example of the preferred embodiment of the damping effectiveness control system according to the present invention, said four examples of said preferred embodiment sharing some common elements.

The present invention will now be described with reference to the preferred embodiment thereof, and with reference to the appended drawings. FIG. 1 is a diagrammatical perspective view of an automobile equipped with an automatic transmission and with a suspension control system including four shock absorber devices, which are designated by the reference numerals 1 through 4: the shock absorber device 1 is for the suspension system for the right front wheel 5 of the vehicle, the shock absorber device 2 is for the suspension system for the left front wheel 6, the shock absorber device 3 is for the suspension system for the right right wheel 7, and the shock absorber device 4 is for the suspension system for the left rear wheel 8. As will be seen, each of these shock absorber devices 1 through 4 is controlled with regard to its damping effectiveness by an example of the preferred embodiment of the damping effectiveness control system according to the present invention, said four examples of said preferred embodiment in fact sharing some common structural elements.

In detail, each of the shock absorber devices 1, 2, 3, and 4 is equipped with an electrically driven actuator 9, 10, 11, and 12 respectively, and, although this is not particularly shown in the drawings, each of these actuators according to selective electrical control thereof controls the flow resistance of an orifice means provided in its corresponding shock absorber device to have one of three different values, i.e. to be either at a maximum value, or a medium value, or a minimum value; so that the respective shock absorber device exhibits either a maximum damping effectiveness, or a medium damping effectiveness, or a minimum damping effectiveness, respectively. The details of the construction provided for the shock absorber devices 1 through 4 and for the actuators 9 through 12 and the orifice means controlled thereby and so on are not particularly shown, because such variable damping effectiveness type shock absorbers are per se known in various forms.

To the instrument panel 13 of the vehicle there is fitted a vehicle speed sensor 14 which is built into a speedometer provided in said instrument panel. This vehicle speed sensor 14 detects the speed of the vehicle along the road, and outputs an electrical signal indicative thereof. Further, on the end of the steering column 15 of the vehicle there is provided a steering sensor 17 which detects the angle through which the steering wheel 16 and the steering column 15 have turned, either way, from their straight ahead positions, and which outputs an electrical signal representative thereof; this signal accordingly is representative of the angle through which the front wheels 5 and 6 of the vehicle have turned, either way, from their straight ahead positions.

And a carburetor fitted to the internal combustion engine 18 of the vehicle has a throttle body to which a throttle position sensor 19 is fitted, and this throttle position sensor 19 detects the amount of opening of a throttle valve provided within the throttle body and outputs an electrical signal representative thereof, i.e. representative of the current load on the engine of the vehicle. In a position close to a brake pedal of the vehicle, not shown but provided within the passenger compartment of the vehicle, there is provided a stop lamp switch 20, which acts as a brake sensor, and is closed when and only when the brake pedal is depressed, thus outputting and electrical resistance signal representative of whether the vehicle is being braked or not. Further, in a position close to a shift lever 22 of the automatic transmission 21 of the vehicle there is provided a neutral start switch 23, which acts as a shift position sensor, and which is closed when the shift lever 22 is set to the N (neutral) position or to the P (park) position, and is otherwise open. Thus, this neutral start switch 23 outputs an electrical resistance signal representative of whether the transmission 21 is currently driving the vehicle, or not.

Finally, at a position inside the passenger compartment of the vehicle close to the instrument panel 13 there is provided a mode select switch unit 24 for the driver of the vehicle to use for manually selecting the control mode for the damping effectiveness control system for the shock absorber devices 1 through 4, as will be explained later: this mode select switch unit 24, in this preferred embodiment of the present invention, comprises a first mode select switch 25 and a second mode select switch 26. And on the instrument panel 13 there is provided an indicator 27 for indicating to the driver of the vehicle the control mode for the damping effectiveness control system for the shock absorber devices 1 through 4 currently selected by the operation of the mode select switch unit 24, as well as the current magnitude of the damping effectiveness being provided by the shock absorber devices 1 through 4.

Figure 2:
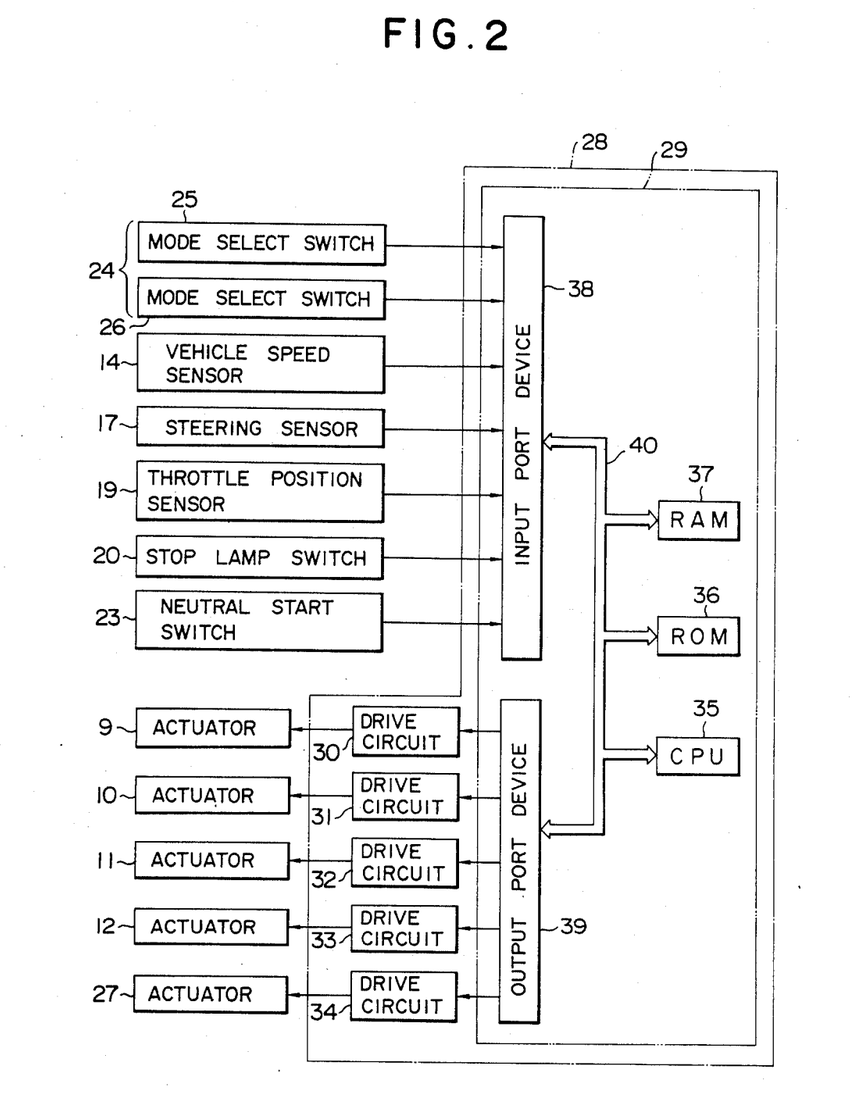
FIG. 2 is a block diagram of the suspension control system shown in FIG. 1.

In FIG. 2, there is shown a block diagram of the suspension control system and the preferred embodiment of the damping effectiveness control ssytem according to the present invention, which incorporates an electronic control device 28. The electrical output signals from all the various sensors and control means just described, i.e. from the mode select switch 25 and the mode select switch 26, from the vehicle speed sensor 14, from the steering sensor 17, from the throttle position sensor 19, from the stop lamp switch 20, and from the neutral start switch 23, are fed via electrical connecting means not particularly shown in the figures to an input port device 38 of a microcomputer 29 incorporated in the electronic control device 28, and the actuators 9 through 12 for the four shock absorber devices 1 through 4 are driven by drive circuits 30 through 33 respectively, also incorporated in the electronic control device 28, which are in their turn driven by an output port device 39 of said microcomputer 29; equally, a drive circuit 34 is provided for the aforementioned indicator 27, and this drive circuit 34 is also driven by said output port device 39 of said microcomputer 29. The microcomputer 29 may be, as suggested in FIG. 2, of per se conventional construction, having a CPU (central processing unit) 35, a ROM (read only memory) 36, and a RAM (random access memory) 37, all linked together and with the input port device 38 and with the output port device 39 by a common bus 40.

The input port device 38 inputs the output electrical signals from the mode select switches 25 and 26 indicative of the orders given by the driver of the vehicle as to how the damping effectiveness control system for the shock absorber devices 1 through 4 is required to operate, the output electrical signal from the vehicle speed sensor 14 indicative of the vehicle road speed, the output electrical signal from the steering sensor 17 indicative of the amount the vehicle is currently turning, the output electrical signal from the throttle position sensor 19 indicative of the current engine load of the vehicle, the output electrical signal from the stop lamp switch 20 indicative of whether the vehicle is currently being braked or not, and the output electrical signal from the neutral start switch 23 indicative of whether the transmission 21 is currently driving the vehicle or not, and under the control of the CPU 35 applies suitable conversions to these signals and outputs digital signals representative thereof to the CPU 35 and/or the RAM 37, said digital signals being used as input data for the calculations performed by the microcomputer 29 as will be explained shortly. And the output port device 39 receives output data of the calculations performed by the microcomputer 29, applies suitable conversions to these signals, and supplies output electrical signals representative thereof to the drive circuits 30 through 34, which according thereto produced and output electrical signals for controlling the actuators 9 through 12 for the shock absorber devices 1 through 4, and the indicator 27, as will also be explained shortly.

The microcomputer 29 performs its calculations by obeying a program stored in its ROM 36 (detailed flow charts of its operation will be explained later), and functionally its effect is as follows. It determines a desired control mode according to the positions of the mode select switches 25 and 26, i.e. determines how the driver of the vehicle requires the damping effectiveness control system for the shock absorber devices 1 through 4 to operate, in the following way: if the switches 24 and 26 are both set by the driver to OFF, then a control mode "normal fixed", which is a manually actuated MANUAL mode, is selected; if the switches 25 and 26 are set by the driver to OFF and to ON, respectively, then a control mode "sport fixed", which also is a manually actuated MANUAL mode, is selected; if the switches 25 and 26 are set by the driver to ON and to OFF, respectively, then a control mode "normal base", which is an automatic or AUTO mode, is selected; and if the switches 25 and 26 are both set by the driver to ON, then a control mode "sport base", which also is an automatic or AUTO mode, is selected.

In other words, if the mode select signal from the mode select switch 25 is OFF, the CPU 35 decides that then the control mode desired is the MANUAL mode; and specifically, if in this case the mode select signal from the other mode select switch 26 is also OFF, then the CPU 35 decides that the control mode desired is the normal fixed MANUAL mode, while on the other hand, if the mode select signal from said other mode select switch 26 is ON, then the CPU 35 decides that the control mode desired is the sport fixed MANUAL mode. Further, in the case of either of these two fixed MANUAL modes, then, as will be described in detail later, regardless of the output signals from the various other sensors and switches described above, according to the program stored in the ROM 36 the CPU 35 constantly outputs control signals through the output port device 39 to control the drive circuits 30 through 33 to constantly set all of the actuators 9 through 12 to the same state, in which they control the damping effectiveness of each of the shock absorber devices 1 through 4 to be the same: in the case of the normal fixed MANUAL mode, said damping effectiveness of each of the shock absorber devices 1 through 4 is thus controlled to be at its minimum value, while on the other hand in the case of the sport fixed MANUAL mode said damping effectiveness of each of the shock absorber devices 1 through 4 is thus controlled to be at its medium value.

On the other hand, if the mode select signal from the mode select switch 25 is ON, the CPU 35 decides that then the control mode desired is the AUTO mdoe; and specifically, if in this case the mode select signal from the other mode select switch 26 is OFF, then the CPU 35 decides that the control mode desired is the normal base AUTO mode, while on the other hand, if the mode select signal from said other mode select switch 26 is also ON, then the CPU 35 decides that the control mode desired is the sport base AUTO mode. Further, in the case of either of these two base AUTO modes, then, as will also be described in detail later, according to the current ongoing values of the output signals from the various other sensors and switches described above, by obeying the program stored in the ROM 36, the CPU 35 outputs control signals through the output port device 39 to ongoingly control the drive circuits 30 through 33 to set the actuators 9 through 12 to various appropriate states, in which they control the damping effectivenesses of the various shock absorber devices 1 through 4 to be appropriate for the current operational conditions of the vehicle, in order to attain good ridability for the vehicle and in order to reduce changes in attitude of the vehicle, such as squat, dive, and roll. In particular, in the case of the normal base AUTO mode, said damping effectiveness of each of the shock absorber devices 1 through 4 is thus controlled to be either at its minimum value, or at its medium value according to the output signals from the various sensors and switches, in other words according to the operational conditions of the vehicle; but, on the other hand, in the case of the sport base AUTO mode, said damping effectiveness of each of the shock absorber devices 1 through 4 is thus controlled to be either at its medium value, or at its maximum value, according to the output signals from the various sensors and switches, in other words according to the operational conditions of the vehicle, and its minimum value is excluded. Also, in each of the various control modes described above, the CPU 35 also outputs via the output port device 39 a control signal which controls the other drive circuit 34 to appropriately drive the indicator 27 to indicate to the driver of the vehicle in what control mode the damping effectiveness control system according to the present invention for the shock absorber devices is functioning.

Now, referring to the flow chart shown in FIG. 3, the operation of the program stored in the ROM 36 of the microcomputer 29, which was described in outline above, will be explained in detail. This flow chart shows the operation of the main or top level of the program in the ROM, and the subroutines of which the flow charts are shown in FIGS. 4A and 4B (to be described later) are called from this main program.

In the step 1 after the start of this main program, initialization of the RAM 12 of the microcomputer 29, as well of the actuators 9 through 12 for the shock absorber devices 1 through 4 for the wheels 5 through 8 respectively, is carried out, and in particular these actuators 9 through 12 are so controlled that the damping effectiveness of each of the shock absorber devices 1 through 4 is set to be at its minimum value. Then the flow of control passes to the step 2.

In the step 2, data is (in fact sequentially) input to the RAM 37 of the microcomputer 29, through the input port device 38, respresentative of the current values of the output signals from the various sensors and switches described earlier, i.e. of the output signals from the mode select switch 25 and the mode select switch 26, from the vehicle speed sensor 14, from the steering sensor 17, from the throttle position sensor 19, from the stop lamp switch 20, and from the neutral start switch 23; and thus this information is available to the CPU 37 henceforward, by inspection of the appropriate RAM locations. As can be easily seen from inspection of FIG. 3, the overall program flow of this program consists of a cycle which returns to this step 2, and in fact this cycle is performed many tens of times per second, except when a delay is introduced during a subroutine called from the step 90 or during a subroutine called from the step 11 as will be explained later; so that up to date and current values of the signals from these various sensors and switches are always being consulted. After this inputting step 2, the flow of control passes next to the step 3, in which this inputted data is preprocessed in preparation for the next stages of the program; the details of this are not given because they are not critical for a general understanding of the system. And next the flow of control proceeds to the next step 4, which is a decision step.

In this step 4, a decision is made as to whether the AUTO mode is currently selected by the vehicle driver or not, in other words as to whether the mode select signal currently being outputted from the mode select switch 25 is an ON signal or not. If the result of this decision is NO, so that the MANUAL operational mode is currently being selected, then the flow of control passes next to the step 5; whereas if the result of this decision is YES, so that the AUTO operational mode is currently being selected, then the flow of control passes next to the step 8.

In the former case, i.e. if the flow of control reaches the step 5, next in this step 5 a decision is made as to whether the normal fixed operational mode is currently selected by the vehicle driver or not, in other words as to whether the mode select signal currently being outputted from the other mode select switch 26 is an OFF signal or not. If the result of this decision is YES, so that that the normal fixed operational mode is currently being selected, then the flow of control passes next to the step 6; whereas if the result of this decision is NO, so that the sport fixed operational mode, rather than the normal fixed one, is currently being selected, then the flow of control passes next to the step 7.

In the step 6, which as explained above is reached if and only if the operational mode currently selected by the vehicle driver is the normal fixed MANUAL mode, then the microcomputer 29 outputs control signals to the actuators 9 through 12 for the shock absorber devices 1 through 4 for the wheels 5 through 8 respectively, via the output port device 39, such as to control said actuators 9 through 12 so that the damping effectiveness of each of the shock absorber devices 1 through 4 is set to be at its minimum value, as is appropriate in this normal fixed MANUAL mode operation. After this process, the flow of control of the FIG. 3 program passes back to the step 2, to cycle again.

In the step 6, which as explained above is reached if and only if the operational mode currently selected by the vehicle driver is the sport fixed MANUAL mode, then the microcomputer 29 similarly outputs control signals to the actuators 9 through 12 for the shock absorber devices 1 through 4, such as to control said actuators 9 through 12 so that the damping effectiveness of each of the shock absorber devices 1 through 4 is set to be at its medium value, as is appropriate in this sport fixed MANUAL mode operation. After this process, the flow of control of the FIG. 3 program passes back to the step 2, to cycle again.

On the other hand, in the latter case of the decision in the step 4, i.e. if the flow of control reaches the step 8 which means that it has been decided that the AUTO mode is currently selected by the vehicle driver, next in this step 8 a decision is made as to whether the normal base AUTO operational mode is currently selected by the vehicle driver or not, in other words as to whether the mode select signal currently being outputted from the other mode select switch 26 is an OFF signal or not. If the result of this decision is NO, so that that the sport base AUTO operational mode, rather than the normal fixed one, is currently being selected, then the flow of control passes next to the step 9; whereas if the result of this decision is YES, so that the normal base operational mode is currently being selected, then the flow of control passes next to the step 10.

Figure 3:
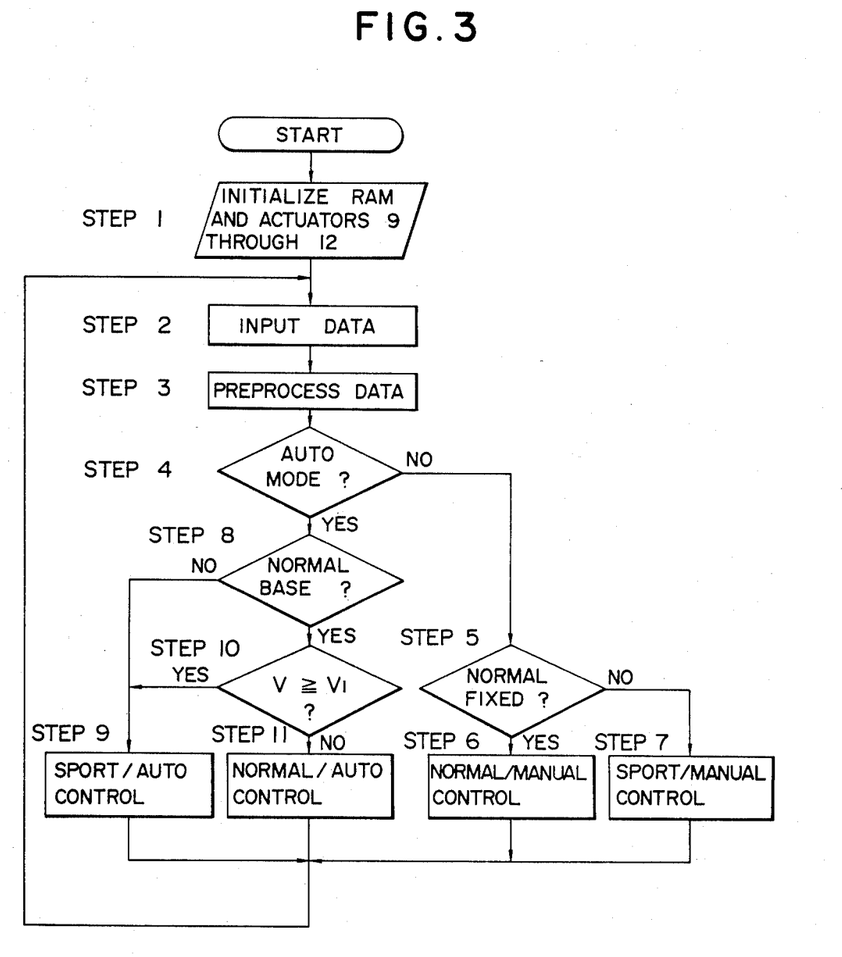
FIG. 3 is a flow chart of the main part of a program of a microcomputer incorporated in said preferred embodiment of the damping effectiveness control system according to the present invention, this part of said program performing the overall control function for said control system.
Figure 4A:
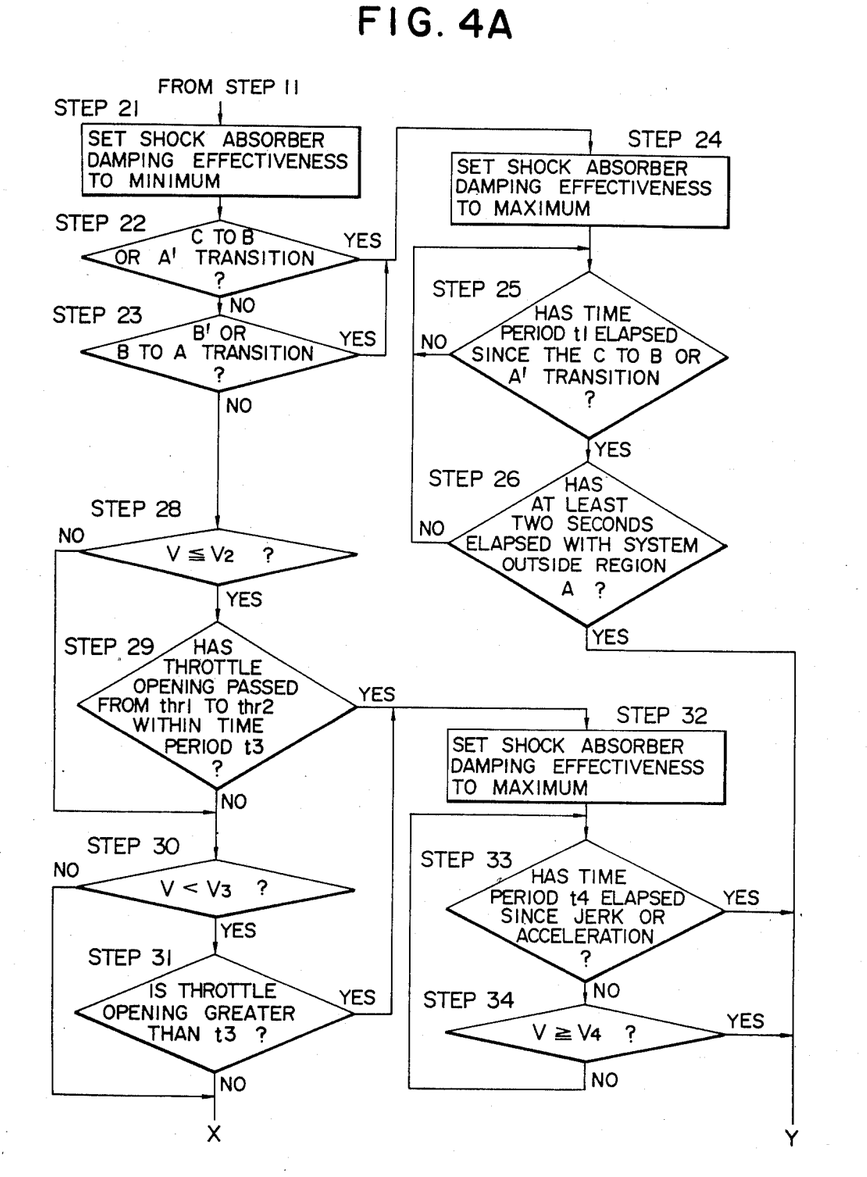
FIG. 4A is another flow chart of another part of said program of said microcomputer, this part being the first part of a subroutine which is called for performing a so called normal base AUTO control function for the suspension control system shown in FIG. 1.
Figure 4B:
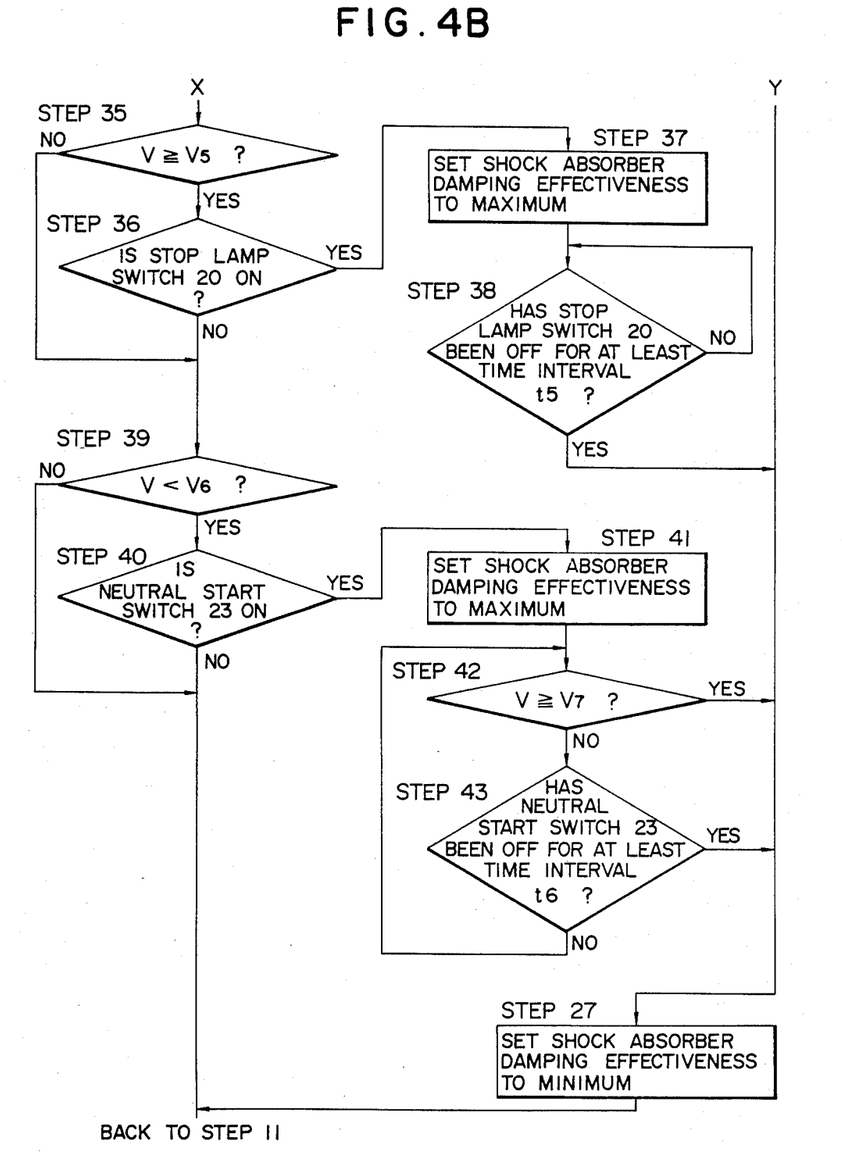
FIG. 4B is yet another flow chart of yet another part of said program of said microcomputer, this part being the second part of the normal base AUTO control subroutine the flow chart of whose first part is shown in FIG. 4A.

In the step 10, at which point in the flow of the FIG. 3 program it has been determined that the normal base operational mode is currently being selected, next a decision is made as to whether the vehicle speed V is greater than a certain determinate value V1, or not. This decision is in order to establish whether the vehicle is currently in a high speed type operational situation, or not; typically the above mentioned determinate speed V1 may be about 80 kph. If the result of this decision is YES, so that the vehicle speed V is greater than V1, then the flow of control passes next to the step 9, so that the control is just as though the sport base AUTO operational mode was being selected by the driver; whereas if the result of this decision is NO, so that the vehicle speed V is less than V1, then the flow of control passes next to the step 11.

Now, in these steps 9 and 11 respectively, as will be particularly described in a moment, the microcomputer 29 performs various appropriate calculations and decisions, and, according to the output signals from the various sensors described above and according to the current values of various vehicle operational parameters detected thereby, appropriately outputs control signals to the actuators 9 through 12 for the shock absorber devices 1 through 4 for the wheels 5 through 8 respectively, via the output port device 39, such as to control said actuators 9 through 12 so that the damping effectiveness of each of the shock absorber devices 1 through 4 is set to be at an appropriate value for these particular operating conditions, respectively between its medium value and its maximum value as is appropriate in the sport base AUTO operational mode, or between its minimum value and its medium value and its maximum value as is appropriate in the normal base AUTO operational mode. After either of these processes shown in step 9 or step 11, the flow of control of the FIG. 3 program passes back to the step 2, to cycle again as before, of course only as long as the ignition switch of the vehicle is in the closed state.

Next, in FIGS. 4A and 4B, which are only separated for the convenience of showing on the limited scale of the drawing paper, the operation of a subroutine called during the program operation to perform the function of the step 11 described above, i.e. to perform the control of the damping effectiveness of each of the shock absorber devices 1 through 4 in the case of the normal base AUTO operational mode, will be explained in detail. And later the operation of another subroutine called during the program operation to perform the function of the step 9 described above, i.e. to perform the control of the damping effectiveness of each of the shock absorber devices 1 through 4 in the case of the sport base AUTO operational mode, will be explained by analogy with the subroutine of FIGS. 4A and 4B. These subroutines will be explained with reference to the graph of FIG. 5, which is a type of phase space diagram in which vehicle speed is shown along the horizontal axis and steering angle is shown along the vertical axis, showing various phase space regions in which roll limiting effect can be obtained in varying amounts by increase in the damping effectiveness of the shock absorbers: data corresponding to the information in this graph is determined in advance by experiment, and is stored in the ROM 36 of the microcomputer 29 in digital form. In this figure, the region A of the phase space is a region of pairs of values of the vehicle speed and the turning angle (i.e. the angle from the straight ahead position through which the steering gear of the vehicle is turned, as measured by the steering sensor 17) in which increase of the damping effectiveness of the shock absorber devices 1 through 4 has a strong roll limiting effect upon the vehicle; the region B is a phase space region in which such increase of the damping effectiveness of the shock absorber devices 1 through 4 has a much weaker but still perceptible roll limiting effect; the region C is a phase space region in which such increase of the damping effectiveness of the shock absorber devices 1 through 4 has little or no perceptible roll limiting effect; and the region A' is a transitional region between the region A and the region B, while similarly the region B' is a transitional region between the region B and the region C.

In the FIG. 11 subroutine, the flow of control is shown as entering at the top of FIG. 4A, and first passes to the step 21. In this step 21, the damping effectiveness of each of the shock absorber devices 1 through 4 is set to its minimum value, by appropriate output of signals to the actuators 9 through 12 thereof via the output port device 39 by the microcomputer 29. Then the flow of control passes to the step 22, which is the first of many decision steps. Now, as will be explained in detail shortly, the flow of the remainder of this subroutine of FIGS. 4A and 4B is as follows: the operational conditions of the vehicle are subjected in turn to four groups of tests, and if the conditions of each test group in turn are not satisfied then the next such test group is performed. This control flow is shown down along the left hand side of FIGS. 4A and 4B. If the conditions of the fourth and last test group are also not satisfied, as well as the conditions of the first through the third test group not being satisfied, then the flow of control exits at the bottom of FIG. 4B and returns to the main program of FIG. 3 with the damping effectiveness of each of the shock absorber devices 1 through 4 still remaining set to its minimum value, and the main cycle of said main program of FIG. 3 is again repeated; and in this case this cycle, and the above described descent down the left hand sides of FIGS. 4A and 4B, is performed several times per second as the vehicle operates. This is the usual operational mode. On the other hand, if the conditions of any one of the four groups of tests are found to be satisfied, then the flow of control passes from the left hand side of FIGS. 4A or 4B to the right hand side, and the following processes occur. First, in the step 24, the step 32, the step 37, or the step 41 the damping effectiveness of each of the shock absorber devices 1 through 4 is set to its maximum value, by appropriate output of signals to the actuators 9 through 12 thereof via the output port device 39 by the microcomputer 29. Then the flow of control enters a delay loop, which detains said control flow for a certain time period of the order of a few seconds until some particular condition is fulfilled. This brief period of increased damping effectiveness of the shock absorber devices 1 through 4 is effective in order to counteract the deleterious effects of, respectively, sharp vehicle turning which tends to cause vehicle body roll, sharp vehicle acceleration which tends to cause vehicle tail squat, sharp vehicle braking which tends to cause vehicle nose diving, and vehicle starting off which can tend to cause either vehicle tail squat or tail lift. And, in any of these cases, after the end of this brief period of increased damping effectiveness, finally the flow of control is transferred to the step 27, in which the damping effectiveness of each of the shock absorber devices 1 through 4 is reset to its minimum value, again by appropriate output of signals to the actuators 9 through 12 thereof via the output port device 39 by the microcomputer 29; and then the flow of control returns to the main program of FIG. 3 with the damping effectiveness of each of the shock absorber devices 1 through 4 now thus being reset to its minimum value, and the main cycle of said main program of FIG. 3 is again repeated; and in this case this particular iteration of said main program cycle has taken much longer than in the previous case, since the above mentioned delay loop has been included.

Now the conditions of these four groups of tests, and the conditions relating to each of the aforementioned delay loops, will be explained in detail.

(1) THE FIRST TEST GROUP

Figure 5:
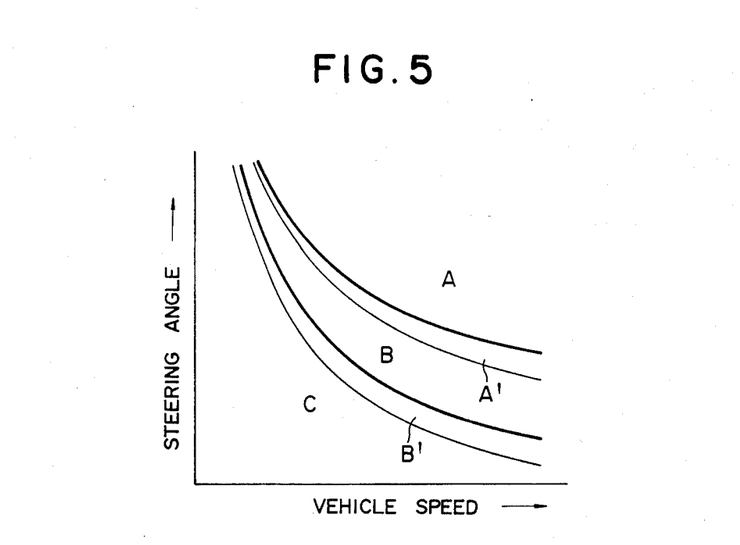
FIG. 5 is a type of phase space graph in which vehicle speed is shown along the horizontal axis and steering angle is shown along the vertical axis, showing various phase space regions in which roll limiting effect for the vehicle can be obtained in varying amounts by increase in the damping effectiveness of the shock absorbers.

In the first group of tests at the upper left part of FIG. 4A, to which the flow of control descends from the step 21, first in the step 22 a decision is made as to whether a change of the operational conditions of the vehicle has led the point in the phase space of FIG. 5 representing said operational conditions from the region C either to the region B or to the region A', i.e. as to whether the phase space point representing the operational conditions of the vehicle in speed and vehicle turning angle has transited from a region in which increase of the damping effectiveness of the shock absorbers 1 through 4 is ineffective for decreasing vehicle body roll angle to a region in which said increase of damping effectiveness is at least somewhat effective for thus decreasing vehicle body roll angle. This decision is implemented by using certain flags and/or variables, which will not be particularly explained here in detail because to a person of ordinary skill in the computer art various possibilities therefore will be clear based upon the descriptions herein. If the result of this decision is YES, so that now increase of the damping effectiveness of the shock absorbers 1 through 4 will be useful and effective for decreasing vehicle body roll angle, then the flow of control passes next to the step 24; whereas if the result of this decision is NO, so that at least this proposed space transition has not occurred to make such increase of the damping effectiveness of the shock absorbers 1 through 4 effective for thus decreasing vehicle body roll angle, then the flow of control passes next to the step 23. And in this next step 23 a decision is made as to whether a change of the operational conditions of the vehicle has led the point in the phase space of FIG. 5 representing said operational conditions from the region B' or from the region B to the region A, i.e. as to whether the phase space point representing the operational conditions of the vehicle in terms of vehicle speed and vehicle turning angle has transited from a region in which increase of the damping effectiveness of the shock absorbers 1 through 4 is moderately effective for decreasing vehicle body roll angle to a region in which said increase of damping effectiveness is clearly and definitely effective for thus decreasing vehicle body roll angle. Again, this decision is implemented by using certain flags and/or variables, not particularly shown herein. If the result of this decision is YES, so that now increase of the damping effectiveness of the shock absorbers 1 through 4 will be definitely effective for decreasing vehicle body roll angle, then the flow of control passes next to the step 24, as before; whereas if the result of this decision is NO, so that also this proposed phase space transition has not occurred to make such increase of the damping effectiveness of the shock absorbers 1 through 4 very effective for thus decreasing vehicle body roll angle, then the flow of control passes next to the step 28, to now start the second group of tests.

ROLL LIMITING EFFECT

If either of the tests in the decision steps 22 or 23 of the first group of tests gives a YES answer, then the flow of control is transferred to the step 24, which is for initiating the provision of roll limiting effect by the preferred embodiment of the damping effectiveness control system according to the present invention. In this step 24, the damping effectiveness of each of the shock absorber devices 1 through 4 is set to its maximum value, by appropriate output of signals to the actuators 9 through 12 thereof via the output port device 39 by the microcomputer 29. This is effective for limiting the amount of body roll of the vehicle, as has already been decided by the first group of tests explained above. Next, the flow of control passes to the step 25, to enter a delay loop, as follows: in the step 25 a decision is made as to whether a determinate time interval t1, for example equal to two seconds, has elapsed since the point in the phase space of FIG. 5 transited from the region C either to the region B or to the region A', or not. Again, this decision is implemented by using certain flags and/or variables, not particularly shown herein. If the result of this decision is NO, so that the shock absorber effectiveness increase for roll limitation has not yet been performed for two seconds, then the flow of control is transferred back to the step 25 again, to perform a tight delay loop until the result of the decision becomes YES; whereas if the result of this decision is YES, so that now two seconds (exemplarily) have elapsed since shock absorber effectiveness increase for roll limitation was started, then the flow of control passes next to the step 26. In this decision step 26, a decision is made as to whether a time period t2, for example equal to two seconds, has elapsed with the point in the phase space of FIG. 5 continuously outside the region A, or not. Again, this decision is implemented by using certain flags and/or variables, not particularly shown herein. If the result of this decision is NO, so that the region of high effectiveness of roll limitation of shock absorber effectiveness increase has not yet been left for a period of two seconds, then the flow of control is transferred back to the step 25 again, to again perform a tight delay loop until the result of the step 26 decision becomes YES; whereas if the result of this decision is YES, so that now at least two seconds (exemplarily) have elapsed since shock absorber effectiveness increase for roll limitation ceased to be very effective, then the flow of control passes next to the step 27, shown in FIG. 4B, In this step 27, as outlined previously, the damping effectiveness of each of the shock absorber devices 1 through 4 is reset to its minimum value, again by appropriate output of signals to the actuators 9 through 12 thereof via the output port device 39 by the microcomputer 29; and then the flow of control returns to the main program of FIG. 3 with the damping effectiveness of each of the shock absorber devices 1 through 4 now thus being reset to its minimum value, and the main cycle of said main program of FIG. 3 is again repeated. Thus, in this case, this particular iteration of said main program cycle has taken much longer than in the cases of manual control explained previously since the above mentioned delay loop including the steps 25 and 26 has been included, which has detained the control flow for a certain time period of the order of a few seconds until the conditions explained above, which serve as criteria for detecting the end of conditions in which increased damping effectiveness of the shock absorber devices 1 through 4 will be effective in order to counteract the deleterious effects of sharp vehicle turning which tends to cause vehicle body roll, have been fulfilled. Thus, this brief period of increase of damping effectiveness of the shock absorber devices 1 through 4 to the maximum value thereof provided as explained above by the program steps 24 through 26 is very effective in order to counteract vehicle body roll caused by sharp vehicle turning, when the vehicle is performing a turn within the limits of steering angle and vehicle speed which are liable to produce more than a certain amount of rolling; and when these limits of steering angle and vehicle speed are left, after a certain determinate time the damping effectiveness of the shock absorber devices 1 through 4 is decreased back to its minimum value, in order to provide good ridability for the vehicle.

(2) THE SECOND TEST GROUP

In the second group of tests at the lower left part of FIG. 4A, to which the flow of control descends from the step 23 if and when it has been determined that the conditions of the first group of tests are not fulfilled, first in the step 28 a decision is made as to whether or not the vehicle road speed V is less than or equal to a certain determinate speed V2, for example 20 kph, i.e. as to whether the vehicle speed falls inside or outside a low speed region in which increase of the damping effectiveness of the shock absorbers 1 through 4 is effective for decreasing vehicle squat when the vehicle undergoes sharp increase of acceleration, i.e. high jerk. If the result of this decision is YES, so that now increase of the damping effectiveness of the shock absorbers 1 through 4 will, in the event of sharp increase in vehicle acceleration, be useful and effective for decreasing vehicle squat, then the flow of control passes next to the step 29; whereas if the result of this decision is NO, so that the vehicle speed is judged to be too great for increase of the damping effectiveness of the shock absorbers 1 through 4, in the event of hard vehicle acceleration, to be useful and effective for decreasing vehicle squat, then the flow of control passes next to the step 30, bypassing the step 29 and going directly to a test for high value of vehicle acceleration described below. However, if in fact the vehicle speed is below the determinate speed V2, then in the next step 29 a decision is made as to whether the throttle opening of the vehicle has altered from at most a certain first determinate opening value thr1, which may for example correspond to the $\frac{1}{8}$ opening amount, to at least a second certain determinate opening value thr2, which may for example correspond to the $\frac{1}{2}$ opening amount, within a certain determinate time period t3, which may be exemplarily 0.05 seconds; this is taken as a criterion for sudden increase of vehicle acceleration, i.e. for jerk, sufficient to cause vehicle squat, i.e. as a criterion as to whether increase of the damping effectiveness of the shock absorbers 1 through 4 is now required for decreasing vehicle squat. Again, this step 29 decision is implemented by using certain flags and/or variables, not particularly shown herein. If the result of this decision is YES, so that now increase of the damping effectiveness of the shock absorbers 1 through 4 will be definately effective for decreasing vehicle squat, and is now required, then the flow of control passes next to the step 32, whereas if the result of this decision is NO, so that vehicle jerk is judged to be at the present time not sufficient to cause any squat problem, then the flow of control passes next to the step 30.

In this step 30, a decision is made as to whether or not the vehicle road speed V is less than or equal to a certain determinate speed V3, again for example 20 kph, i.e. as to whether the vehicle speed falls inside or outside a low speed region in which increase of the damping effectiveness of the shock absorbers 1 through 4 is effective for decreasing vehicle squat when the vehicle is undergoing rapid acceleration. If the result of this decision is YES, so that now increase of the damping effectiveness of the shock absorbers 1 through 4 will, in the event of rapid vehicle acceleration, be useful and effective for decreasing vehicle squat, then the flow of control passes next to the step 31; whereas if the result of this decision is NO, so that the vehicle speed is judged to be too great for increase of the damping effectiveness of the shock absorbers 1 through 4, in the event of rapid vehicle acceleration, to be useful and effective for decreasing vehicle squat, then the flow of control passes next to the step 35 of FIG. 4B, bypassing the step 31 and going directly to the third group of tests, described below. However, if in fact the vehicle speed is below the determinate speed V3, then in the next step 31 a decision is made as to whether the throttle opening of the vehicle is greater than a certain third determinate opening value thr3, which may for example correspond to the 2/3 opening amount; this is taken as a criterion for high vehicle acceleration sufficient to cause vehicle squat, i.e. as a criterion as to whether increase of the damping effectiveness of the shock absorbers 1 through 4 is now required for decreasing vehicle squat. If the result of this decision is YES, so that now increase of the damping effectiveness of the shock absorbers 1 through 4 will be definitely effective for decreasing vehicle squat, and is now required, then the flow of control passes next to the step 32, as before, whereas if the result of this decision is NO, so that vehicle acceleration is judged to be at the present time not sufficient to cause any squat problem, then the flow of control passes next to the step 35, to now start the third group of tests.

SQUAT LIMITING EFFECT

If either of the tests in the decision steps 29 or 31 of the second group of tests gives a YES answer, then the flow of control is transferred to the step 32, which is for initiating the provision of squat limiting effect by the preferred embodiment of the damping effectiveness control system according to the present invention. In this step 32, as in the prvious step 24, the damping effectiveness of each of the shock absorber devices 1 through 4 is set to its maximum value, by appropriate output of signals to the actuators 9 through 12 thereof via the output port device 39 by the microcomputer 29. This is effective for limiting the amount of body squat of the vehicle, as is required as just decided by the second group of tests explained above. Next, the flow of control passes to the step 33, to enter a delay loop, as follows: in the step 33 a decision is made as to whether or not a determinate time interval t4, for example equal to two seconds, has elapsed since the decision occurred in the relevant step 29 or 31 from which control was just transferred to the previous step 32; in other words, in the case that control was transferred from the step 29 to the step 32 to reach this step 33, whether or not the determinate time t4 has elapsed since the throttle opening of the vehicle altered from at most the first determinate opening value thr1 to at least the second determinate opening value thr2 within the certain determinate time period t3, and, in the case that control was transferred from the step 31 to the step 32 to reach this step 33, whether or not the determinate time t4 has elapsed since the throttle opening of the vehicle altered to be above the third determinate opening value thr3. Again, this decision is implemented by using certain flags and/or variables, not particularly shown herein. If the result of this decision is YES, so that the shock absorber effectiveness increase for squat limitation has now been performed for two seconds, then the flow of control is transferred next to the step 27, shown in FIG. 4B and described above, and so shock absorber effectiveness increase for squat limitationis terminated. On the other hand, if the result of this decision is NO, so that as yet squat limitation has not yet been performed for (exemplarily) two seconds, then the flow of control passes next to the step 34. In this decision step 34, a decision is made as to whether or not the vehicle road speed V is greater than or equal to a certain determinate speed V4, for example 30 kph, i.e. as to whether the vehicle speed falls inside or outside a certain lower speed region in which increase of the damping effectiveness of the shock absorbers 1 through 4 is at all effective for decreasing vehicle squat when the vehicle is undergoing rapid acceleration or high jerk. If the result of this decision is NO, so that the region of high effectiveness for squat limitation of shock absorber effectiveness increase has not been left, then the flow of control is transferred back to the step 33 again, to again perform a tight delay loop until the result of the step 33 decision or of the step 34 decision becomes YES; whereas if the result of this decision is YES, so that now the vehicle speed is too high for shock absorber effectiveness increase to be effective for squat limitation, then the flow of control passes to the step 27 of FIG. 4B, in which, as outlined previously, the damping effectiveness of each of the shock absorber devices 1 through 4 is reset to its minimum value; and then the flow of control returns to the main program of FIG. 3 with the damping effectiveness of each of the shock absorber devices 1 through 4 now thus being reset to its minimum value, and the main cycle of said main program of FIG. 3 is again repeated. Thus, again in this case, this particular iteration of said main program cycle has taken sevreal seconds, i.e. much longer than did the cases of manual control explained previously, since the above mentioned delay loop including the steps 33 and 34 has been included, which has detained the control flow until the conditions explained above, which serve as criteria for detecting the end of conditions in which increased damping effectiveness of the shock absorber devices 1 through 4 will be effective in order to counteract the deleterious effects of sharp vehicle jerk or acceleration which tend to cause vehicle squat, have been fulfilled. Thus, this brief period of increased damping effectiveness of the shock absorber devices 1 through 4 provided as explained above by the steps 32 through 34 is very effective in order to counteract vehicle squat caused by sharp vehicle acceleration or sudden increase of acceleration; and then the damping effectiveness of the shock absorber devices 1 through 4 is returned to the minimum value, in order to provide satisfactory vehicle ridability.

(3) THE THIRD TEST GROUP

In the third group of tests at the upper left part of FIG. 4B, to which the flow of control is transferred from the step 31 if and when it has been determined that the conditions of the second group of tests and of the first group of tests are not fulfilled, first in the step 35 a decision is made as to whether or not the vehicle road speed V is greater than or equal to another certain determinate speed V5, for example 60 kph, i.e. as to whether the vehicle speed falls inside or outside a high speed region in which increase of the damping effectiveness of the shock absorbers 1 through 4 is effective for decreasing vehicle nose dive when the vehicle undergoes sharp braking. If the result of this decision is YES, so that now increase of the damping effectiveness of the shock absorbers 1 through 4 will, in the event of sharp vehicle braking, be useful and effective for decreasing vehicle nose dive, then the flow of control passes next to the step 36 which tests for such braking; whereas if the result of this decision is NO, so that the vehicle speed is judged to be too low for increase of the damping effectiveness of the shock absorbers 1 through 4, in the event of hard vehicle braking, to be useful and effective for decreasing vehicle nose dive, then the flow of control passes next to the step 39, bypassing the step 36 and going directly to the step 39, to now start the fourth group of tests. However, if in fact the vehicle speed is above the determinate speed V5, then in the next step 36 a decision is made as to whether the stop lamp switch 20 is closed, or not: this is taken as a criterion for sudden vehicle braking sufficient to cause vehicle nose dive, i.e. as a criterion as to whether increase of the damping effectiveness of the shock absorbers 1 through 4 is now required for decreasing vehicle nose dive. If the result of this decision is YES, so that now increase of the damping effectiveness of the shock absorbers 1 through 4 will be definitely effective for decreasing vehicle nose dive, and is now required, then the flow of control passes next to the step 37; whereas if the result of this decision is NO, so that vehicle braking is judged to be at the present time not sufficient to cause any nose dive problem, then the flow of control passes next to the step 39, to now start the fourth group of tests.

NOSE DIVE LIMITING EFFECT

If the test in the decision step 36 of the third group of tests gives a YES answer, then the flow of control is transferred to the step 37, which is for initiating the provision of nose dive limiting effect by the preferred embodiment of the damping effectiveness control system according to the present invention. In this step 37, as in the previous steps 24 and 32, the damping effectiveness of each of the shock absorber devices 1 through 4 is set to its maximum value, by appropriate output of signals to the actuators 9 through 12 thereof via the output port device 39 by the microcomputer 29. This is effective for limiting the amount of nose dive of the vehicle, as is required as just decided by the third group of tests explained above. Next, the flow of control passes to the step 38, to enter a delay loop, as follows. In this step 38 a decision is made as to whether or not a determine time interval t5, for example equal to two seconds, has elapsed since the stop lamp switch 20 has last been on. Again, this decision is implemented by using certain flags and/or variables, not particularly shown herein. If the result of this decision is YES, so that the shock absorber effectiveness increase for nose dive limitation has now been performed for two seconds after the end of braking, then the flow of control is transferred next to the step 27 described above, and so shock absorber effectiveness increase for nose dive limitation is terminated in the same way as before. On the other hand, if the result of this decision is NO, so that as yet nose dive limitation has not yet been performed for (exemplarily) two seconds after the end of braking, then the flow of control passes next back to the step 38 again, to again perform a tight delay loop until the result of this step 38 decision becomes YES.

Thus, as before, if control is transferred to the step 27 of FIG. 4B, the damping effectiveness of each of the shock absorber devices 1 through 4 is reset to its minimum value; and then the flow of control returns to the main program of FIG. 3 with the damping effectiveness of each of the shock absorber devices 1 through 4 now thus being reset to its minimum value, and the main cycle of said main program of FIG. 3 is again repeated. Thus, again in this case, this particular iteration of said main program cycle has taken several seconds, since the above mentioned delay loop including the step 38 has been included, which has detained the control flow until the condition explained above, which serves as a criterion for detecting the end of conditions in which increased damping effectiveness of the shock absorber devices 1 through 4 will be effective in order to counteract the deleterious effects of sharp vehicle braking which tends to cause vehicle nose dive, has been fulfilled. Thus, this brief period of increased damping effectiveness of the shock absorber devices 1 through 4 provided as explained above by the steps 37 and 38 is very effective in order to counteract vehicle nose dive caused by sharp vehicle braking, during vehicle operation in a medium to high speed operational region; and then the damping effectiveness of the shock absorber devices 1 through 4 is returned to the minimum value, in order to provide satisfactory vehicle ridability.

(4) THE FOURTH TEST GROUP

In the fourth group of tests at the lower left part of FIG. 4B, to which the flow of control descends from the step 36 if and when it has been determined that the conditions of the third group of tests and also of the second group of tests and of the first group of tests are not fulfilled, first in the step 39 a decision is made as to whether or not the vehicle road speed V is less than another certain determinate speed V6, for example 10 kph, i.e. as to whether the vehicle speed falls inside or outside a low speed region in which increase of the damping effectiveness of the shock absorbers 1 through 4 is effective for decreasing vehicle starting off squat or tail lift when the vehicle undergoes acceleration, either forwards or backwards respectively, from a rest or near rest condition. If the result of this decision is YES, so that now increase of the damping effectiveness of the shock absorbers 1 through 4 will, in the event of the vehicle being accelerated, be useful and effective for decreasing vehicle starting squat or tail lift, then the flow of control passes next to the step 40 which tests for such starting; whereas if the result of this decision is NO, so that the vehicle speed is judged to be too high for any problem of starting squat or tail lift to arise, then the flow of control passes down to the end of the subroutine of FIGS. 4A and 4B and exits at the bottom of FIG. 4B to return to the step 11 of FIG. 3, to cycle around the main loop of the main program of FIG. 3 again. However, if in fact the vehicle speed is below the determinate speed V6, then in the next step 40 a decision is made as to whether or not the neutral start switch 23 is closed (which indicates that the vehicle transmission is shifted to a forward or backward movement speed range such as D range or L range or R range, i.e. is not shifted to neutral or N range or parking or P range): this, in this low speed operational area, is taken as a criterion for the vehicle being ready to be accelerated to such an amount as might cause starting squat or tail lift, i.e. as a criterion as to whether increase of the damping effectiveness of the shock absorbers 1 through 4 is now required for preventing the possibility of such starting squat or tail lift. If the result of this decision is YES, so that increase of the damping effectiveness of the shock absorbers 1 through 4 against the possibility of starting squat to tail lift is now required, then the flow of control passes next to the step 41; whereas if the result of this decision is NO, so that at the present time in any case the vehicle cannot be moved either forwards or backwards and hence problems of starting squat or tail lift cannot occur, then again the flow of control passes down to the end of the subroutine of FIGS. 4A and 4B and exits at the bottom of FIG. 4B to return to the step 11 of FIG. 3, to cycle around the main loop of the main program of FIG. 3 again.

STARTING SQUAT OR TAIL LIFT LIMITING EFFECT

If the test in the decision step 40 described above of the fourth group of tests gives a YES answer, then the flow of control is transferred to the step 41, which is for initiating the provision of starting squat or tail lift limiting effect by the preferred embodiment of the damping effectiveness control system according to the present invention. In this step 41, as in the previous steps 24, 32, and 37, the damping effectiveness of each of the shock absorber devices 1 through 4 is set to its maximum value, by appropriate output of signals to the actuators 9 through 12 thereof via the output port device 39 by the microcomputer 29. This is effective for limiting the amount of starting squat or tail lift of the vehicle, as is required as just decided by the fourth group of tests explained above. Next, the flow of control passes to the step 42, to enter a delay loop, as follows: in the step 42 a decision is made as to whether or not the vehicle road speed V is greater than or equal to a certain determinate speed V7, for example 15 kph, i.e. as to whether the vehicle speed falls inside or outside a certain lower speed region in which starting squat or tail lift is a problem. If the result of this decision is YES, so that the region of problematical starting squat or tail lift has now definitely been left, then the flow of control is transferred next to the step 27, described above, and shock absorber effectiveness increase for starting squat or tail lift limitation is terminated. On the other hand, if the result of this decision is NO, so that the region of problematical starting squat or tail lift has not yet been left, then the flow of control is transferred to the next step 43. In this decision step 43, a decision is made as to whether or not a determinate time interval t6, for example equal to five seconds, has elapsed since last the neutral starting switch 23 was in the on condition, i.e. since last the transmission of the vehicle has been engaged to any forward driving speed range. Again, this decision is implemented by using certain flags and/or variables, not particularly shown herein. If the result of this decision is NO, so that the transmission has not yet been in a non driving operational condition for as much as five seconds, then the flow of control is transferred back to the step 42 again, to again perform a tight delay loop until the result of the step 42 decision or of the step 43 decision becomes YES; whereas if the result of this decision is YES, so that now the transmission of the vehicle has been out of any forward driving speed range for at least said determinate time period t6 of (exemplarily) five seconds, then the flow of control passes to the step 27, in which, as outlined previously, the damping effectiveness of each of the shock absorber devices 1 through 4 is reset to its minimum value; and then the flow of control returns to the main program of FIG. 3 with the damping effectiveness of each of the shock absorber devices 1 through 4 now thus being reset to its minimum value, and the main cycle of said main program of FIG. 3 is again repeated. Thus, again in this case, this particular iteration of said main program cycle has taken several seconds, since the above mentioned delay loop including the steps 42 and 43 has been included, which has detained the control flow until the conditions explained above, which serve as criteria for detecting the end of conditions in which increased damping effectiveness of the shock absorber devices 1 through 4 is required in order to counteract possible starting squat or tail lift, have been fulfilled. Thus, this brief period of increased damping effectiveness of the shock absorber devices 1 through 4 provided as explained above by the steps 41 through 43 is very effective in order to counteract vehicle starting squat or tail lift caused by vehicle acceleration from a very low vehicle speed or from rest; and then the damping effectiveness of the shock absorber devices 1 through 4 is returned to the minimum value, in order to provide satisfactory vehicle ridability.

Thus it is seen that, in this normal base AUTO operational mode, the damping effectivenesses of the shock absorber devices 1 through 4 are switched to and fro between their minimum values and their maximum values, being kept at their minimum values in order to provide satisfactory vehicle ridability at a well cushioned level, except when they are required to be increased to their maximum values in order to counteract the effects of vehicle roll, vehicle squat, vehicle nose dive, or vehicle starting squat or tail lift.

The operation of the other subroutine called during the program operation to perform the function of the step 9 of the main program of FIG. 3 described above, i.e. to perform the control of the damping efectiveness of each of the shock absorber devices 1 through 4 in the case of the sport base AUTO operational mode, will not be shown in detail, but will instead be explained by analogy with the above described subroutine of FIGS. 4A and 4B for the step 11 described above. This subroutine for step 9 is the same as the step 11 subroutine just described, except that in the steps thereof corresponding to the steps 21 and 27 of said step 11 subroutine described above, rather than the damping effectiveness of each of the shock absorber devices 1 through 4 being set to its minimum value by appropriate output of signals to the actuators 9 through 12 thereof via the output port device 39 by the microcomputer 29, instead the damping effectiveness of each of the shock absorber devices 1 through 4 is in a similar fashion set to its medium value. And thus, in the steps of the FIG. 9 surbroutine corresponding to the steps 24, 32, 37, and 41 of the step 11 subroutine described above, the damping effectivenesses of the shock absorber devices 1 through 4 are switched from their medium to their maximum values, while correspondingly in the step of said FIG. 9 subroutine corresponding to the step 27 of the step 11 subroutine described above the damping effectivenesses of the shock absorber devices 1 through 4 are switched from their maximum to their medium values. Accordingly, in this sport base AUTO operational mode, the damping effectivenesses of the shock absorber devices are switched to and fro between their medium values and their maximum values, being kept at their medium values in order to provide satisfactory vehicle ridability at a relatively hard and sporty feeling level, except when they are required to be increased to their maximum values in order to counteract the effects of vehicle roll, vehicle squat, vehicle nose dive, or vehicle starting squat or tail lift.

Now, in an alternative embodiment, the above described series of fours sets of tests, respectively relating to provision of increased shock absorber effectiveness for roll prevention, for squat prevention, for nose dive prevention, and for starting squat and tail lift prevention, could be performed in a different order, as long as the overall logic thereof was maintained. Further, although the present invention was shown as applied to a vehicle incorporating an automatic transmission, the present invention should not be considered as being restricted to this application, but also could be applied to the case of a vehicle equipped with a manual transmission; and in such a case the steps 39 to 43 of the subroutine whose flow chart is shown in FIG. 4B would be omitted. As another possible deviant embodiment of the present invention, in the main routine whose flow chart is shown in FIG. 3, it would be possible to interpose between the steps 5 and 6 a test, like the test made in the step 10 for the other branch, as to whether the vehicle speed V was greater than or less than another determine speed value V8, for example 80 kph, and in this case, if in fact the vehicle speed V was less than this value V8, control flow would be directed to the step 6, while on the other hand, if in fact the vehicle speed V was greater than this value V8, control flow would be directed to the step 7. In the case of this modification, as compared with the operation of the preferred embodiment described above, when the normal fixed MANUAL mode is selected by the driver, the steering stability of the vehicle in high speed operational conditions can be improved. Also, as another alternative possible variation, if the step 9 is reached after a decision in the step 10 that the vehicle speed V is in fact greater than the determinate value V1, in this case it is possible to omit the steps 28 through 43 in FIGS. 4A and 4B.

Thus, it is seen that in the shock absorber device control system according to the present invention, when said system is set by the vehicle operator to either of its manual modes, then the shock absorber devices are only set to their minimum or their medium damping effectivenesses, and are never set to their maximum damping effectivenesses, i.e. are prevented, during manual system operation, from being set to their hardest settings. Thus, since the hardest settings of said shock absorber device are not available in manual mode, it is prevented that, due to improper or injudicious manual actuation of the system by the vehicle driver, the shock absorber devices should be set to an over high damping effectiveness which is harder than necessary, and that due to such improper manual operation by the driver the vehicle ridability should be deteriorated. Thus, deterioration of vehicle operational comfort due to an unskilful vehicle driver erroneously making an operational mode selection which is inappropriate for particular vehicle operational circumstances, or due to neglect of operation of said control system by a vehicle driver who may be unaccustomed to the operation of the mode select switch thereof, is positively prevented. Further, in the automatic operational mode, then the shock absorber devices can be set, according to vehicle operational conditions, either to their minimum, their medium, or their maximum damping effectivenesses, and accordingly said shock absorber devices are, during automatic system operation, allowed to be set to their hardest settins in which they provide their greatest values of damping effectiveness, so that the full operational potential of the shock absorber devices is allowed to be realized during their automatic system operation. Thereby, during automatic shock absorber control operation, satisfactory vehicle ridability and steering stability can be provided.

Accordingly, although the present invention has been shown and described with reference to the preferred embodiment thereof, and in terms of the illustrative drawings, it should not be considered as limited thereby. As suggested above, various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

What is claimed is:

1. For a variable damping effectiveness type shock absorber, comprising an actuator, for a suspension of a vehicle, said shock absorber by selective actuation of said actuator to respectively a first condition, a second condition, and a third condition, wherein said first condition
provides a minimum amount of damping effect, said second condition provides a medium amount of damping effect, and said third condition provides a maximum amount of damping effect: a suspension control system, comprising:
a means for detecting one or more parameters relating to the operational condition of the vehicle and for outputting information signals representative thereof;
a manually controlled selecting means for permitting an operator to manually select between a first manual operational mode, a second manual operational mode, a first auto operational mode and a second auto operational mode; and
a control means for: when said manually controlled selecting means is selecting said first manual operational mode, actuating said actuator to its said first condition; when said manually controlled selecting means is selecting said second manual operational mode, actuating said actuator to its said second condition; when said manually controlled selecting means is selecting said first auto operational mode, actuating said actuator to one of a set of its said conditions including its said first condition and its said third condition, according to said information signals representing the operational condition of the vehicle outputted by said detecting means; and when said manually controlled selecting means is selecting said second auto operational mode, actuating said actuator to either its said second condition or its said third condition, according to said information signals representing the operational condition of the vehicle outputted by said detecting means.

2. A suspension control system according to claim 1, wherein said control means, when said manually controlled selecting means is thus selecting said first auto operational mode, does not substantially actuate said actuator to its said second condition.

3. A suspension control system according to claim 2, wherein said control means, when said manually controlled selecting means is thus selecting said second auto operational mode, does not substantially actuate said actuator to its said first condition.

4. A suspension control system according to claim 1, wherein said control means, when said manually controlled selecting means is thus selecting said second auto operational mode, does not substantially actuate said actuator to its said first condition.

5. A suspension control system according to claim 1, wherein said detecting means comprises a vehicle speed sensor which outputs a signal representative of vehicle road speed, and wherein said control means is for, when said vehicle speed sensor is outputting to it a signal indicating a vehicle speed of at least a determinate speed value, and said manually controlled selecting means is selecting said auto operational mode, actuating said actuator to one or the other of its said second condition and its said third condition, according to other information signals outputted by said detecting means.

6. A suspension control system according to claim 5, wherein further said control means is for, when said vehicle speed sensor is outputting to it a signal indicating a vehicle speed of below said determinate speed value, and said manually controlled selecting means is selecting said auto operational mode, actuating said actuator to one or the other of its said first condition and its said third condition, according to other information signals outputted by said detecting means.

7. A suspension control system according to claim 1, wherein said detecting means comprises a vehicle speed sensor which outputs a signal representative of vehicle road speed and a vehicle steering angle sensor which outputs a signal representative of turning angle of a steering system of the vehicle, and wherein said control means is for, when said vehicle speed sensor and said vehicle steering angle sensor are outputting to it signals indicating a combination of vehicle speed and vehicle steering angle which is liable to cause body roll, and said manually controlled selecting means is selecting said auto operational mode, actuating said actuator to its said third condition.

8. A suspension control system according to claim 1, wherein said detecting means comprises a vehicle throttle sensor which outputs a signal representative of vehicle engine load, and wherein said control means is for, when said vehicle throttle sensor is outputting to it a signal indicating a vehicle powering condition which is liable to cause vehicle body squat, and said manually controlled selecting means is selecting said auto operational mode, actuating said actuator to its said third condition.

9. A suspension control system according to claim 1, wherein said detecting means comprises a vehicle braking sensor which outputs a signal representative of vehicle braking situation, and wherein said control means is for, when said vehicle braking sensor is outputting to it a signal indicating a vehicle braking condition which is liable to cause vehicle body nose diving, and said manually controlled selecting means is selecting said auto operational mode, actuating said actuator to its said third condition.

10. A suspension control system according to claim 1, wherein said detecting means comprises a vehicle transmission sensor which outputs a signal representative of vehicle transmission driving capability, and wherein said control means is for, when said vehicle transmission sensor is outputting to it a signal indicating a vehicle transmission driving capability condition which is liable to cause vehicle starting squat or tail lift, and said manually controlled selecting means is selecting said auto operational mode, actuating said actuator to its said third condition.

* * * * *